United States Patent [19]

Hess

[11] 4,258,930
[45] Mar. 31, 1981

[54] HITCHING DEVICE WITH SAFETY LOCK

[76] Inventor: Donald F. Hess, Rte. 1, Box 25, Evansville, Ill. 62242

[21] Appl. No.: 13,898

[22] Filed: Feb. 22, 1979

[51] Int. Cl.³ .............................................. B60D 1/12
[52] U.S. Cl. .................................... 280/508; 280/487
[58] Field of Search ............... 280/487, 504, 507, 508, 280/509, 510, 511, 512, 513, 514, 515; 248/119 S

[56] References Cited

U.S. PATENT DOCUMENTS

| | | | |
|---|---|---|---|
| 731,707 | 6/1903 | Putnam | 280/510 |
| 856,795 | 6/1907 | Morris | 280/509 |
| 1,527,149 | 2/1925 | Holland | 280/509 |
| 2,636,744 | 4/1953 | Trees | 280/510 |
| 3,088,752 | 5/1963 | Dressen | 280/508 |

Primary Examiner—Randolph A. Reese
Assistant Examiner—Randall A. Schrecengost
Attorney, Agent, or Firm—Rogers, Eilers & Howell

[57] ABSTRACT

An automatic hitch with safety lock may be mounted on a tractor or the like and has two laterally opposed jaws and a hook member pivotally connected therebetween and provides completely automatic latching and unlatching to an upstanding pin provided on a wagon or trailer. The latch has a combination release and spring operator for remotely retracting the hook member and unlatching the pin from the hitch. A safety lock has a lock shaft which rides a shoulder on the hook member and prevents the hook member from being retracted to an open position until the lock shaft is retracted from a position adjacent the shoulder. The safety lock may be remotely operated and has a spring biasing it into the locked position. A manual lock pin may be inserted to effectively disable the automatic operation of the hitch. A mounting plate is used to attach the hitch to a tractor or other vehicle and shock absorber springs are provided between the hitch portion and the mounting plate.

9 Claims, 6 Drawing Figures

U.S. Patent  Mar. 31, 1981  4,258,930
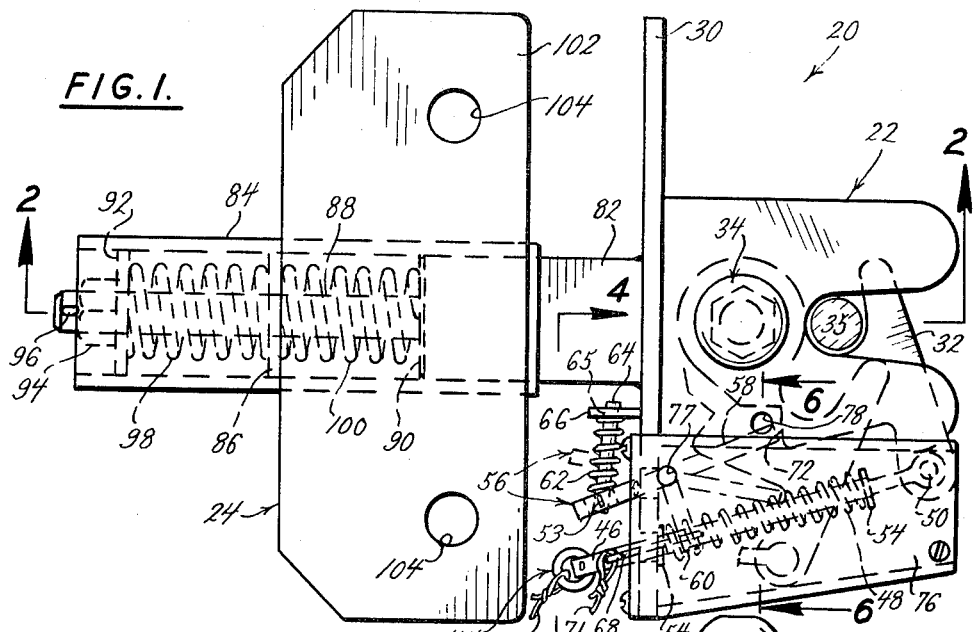
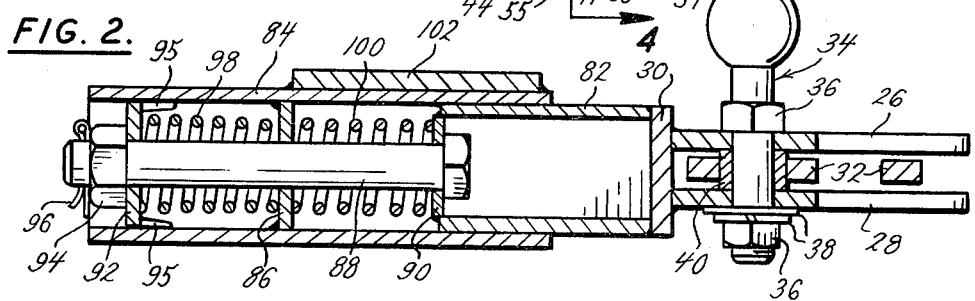
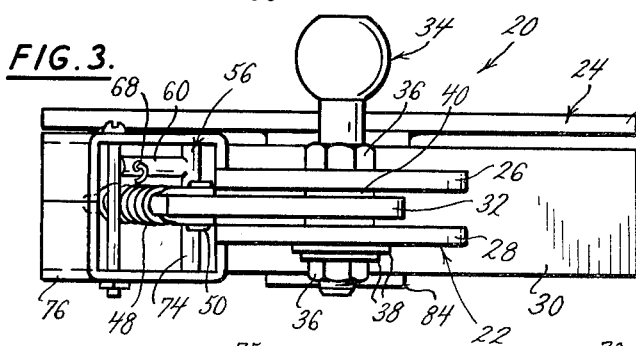
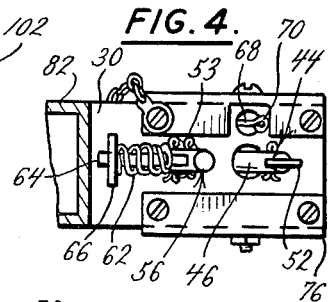
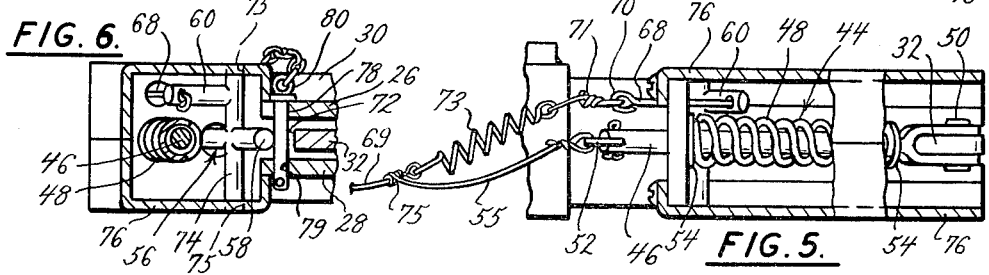

HITCHING DEVICE WITH SAFETY LOCK

BACKGROUND AND SUMMARY

Hitching devices which permit a tractor or similar vehicle to connect to a wagon or the like have been known for many years. Many types of hitches have been developed including those having laterally opposed jaws and a pivotable hook member mounted therebetween with a spring biasing the hook member into the closed position. An upstanding pin may be provided on the tongue of the wagon or other vehicle to be towed and the tractor connects to the pin by backing the hitch against the pin. If the hook member has a tapered head, the pin will push the hook member open and the hitch may be automatically coupled onto the wagon while the operator remains in the cab of the tractor.

Some hitches have been provided with release mechanisms which permit the operator to retract the hook member from a remote location such as the cab and unhitch the wagon from the tractor. This permits a farmer to quickly and easily pick up and move wagons, drop them off, and return for other wagons all without leaving the cab or seat of the tractor. Not only does this save time, but it is a significant improvement over other types of hitching mechanisms which require that flanges or the like be aligned with matching flanges on the tractor and a pin be manually inserted before the tractor is hitched to the wagon. However, one of the advantages of the manual type hitch is that safety locks and catches may be easily provided to ensure that the wagon is locked onto the tractor and is not merely dependent upon the spring which urges the hook member into the closed position. It can be appreciated that with the automatic hitches, a manual safety lock would essentially defeat the purpose of the automatic hitch as it would require the operator of the tractor to dismount and engage or disengage the manual lock each time the wagon is hitched or unhitched. Furthermore, is is unlikely that a manual lock provided on an automatic hitch would be used as the typical operator would just not take the time to see that it is properly engaged and disengaged for each hitching operation.

Applicant has succeeded in inventing a safety lock mechanism which may be provided on an automatic hitch and which does not interfere with its automatic operation. The safety lock provides a back up, double lock which holds the hook member in the closed position and prevents the accidental loss of a wagon while towing even should the spring operator of the hook member be damaged or disabled. Furthermore, applicant's safety lock may be remotely operated in combination with the remote hook member operator so that completely automatic operation is retained. To ensure completely safe operation, the safety lock is spring biased into the locked position which provides "dead man" safety override should the operating mechanism be damaged.

Applicant has also designed an automatic hitching mechanism to accommodate the use of the safety lock. This hitch includes many desirable features such as a tapered hook head to provide for automatic engagement of a pin, completely automatic hitch operation including a remotely operable release for the hook member, heavy duty pivot for the hook member including an integral ball type hitch, heavy duty mounting plate suitable for mounting the hitch to various types of vehicles, shock absorbers to isolate the hitch from the vehicle, suitable for orientation in any plane including vertical for use with various types of tongues, and other features as are more fully described in the preferred embodiment.

BRIEF DESCRIPTION OF THE DRAWINGS

FIG. 1 is an overhead view of the hitch and mounting plate;

FIG. 2 is a cross-sectional view taken along the plane of line 2—2 in FIG. 1 and depicting the hitch and mounting plate assembly;

FIG. 3 is a front view of the hitch;

FIG. 4 is a detailed view taken along the plane of line 4—4 in FIG. 1 and showing the forward end of the safety lock and combination release and spring operator with a protective cover in place, FIG. 5 is a cross-sectional side view of the safety lock and combination release and spring operator;

FIG. 6 is a cross-sectional view taken along the plane of line 6—6 in FIG. 1 detailing the manual locking pin and safety lock.

DETAILED DESCRIPTION OF THE PREFERRED EMBODIMENT

Applicant's automatic hitch with safety lock 20 is shown generally in FIG. 1 and includes a hitch 22 and mounting plate 24. The hitch 22 includes laterally opposed jaw members 26, 28 which extend outwardly from a back plate 30. A hook member 32 is disposed between the jaw members 26, 28 and is pivotally mounted by a combination ball hitch and pivot pin assembly 34. An upstanding pin 35 is mounted to the tongue of a wagon or other trailer which is desired to be connected via hitch 20 to the tractor or other vehicle. Locking nuts 36 and washers 38 may be provided as required to tighten ball hitch and pivot pin assembly 34 into position. A spacer 40 is provided between the pivot pin 42 and hook member 32 to ensure the free pivotable movement of hook member 32.

A combination release and spring operator 44 extends between back plate 30 and hook member 32 and provides for the remote unhitching of a load by withdrawing hook member 32 and pivoting it about pivot pin 42. The release and spring operator 44 includes an operating shaft 46, spring 48, pivot assembly 50 and line connector 52. Washers 54 are mounted on operating shaft 46 at opposite ends of spring 48 and hold the spring 48 in position about operating shaft 46 and against back plate 30. This is best shown in FIG. 5. A pull cord 55 attaches to line connector 52 and acts as a linkage between the remote operator (not shown) and the hitch 20. The remote operator may be any cable release type of mechanism and would preferably be mounted near the driver's seat, such as in the cab of a tractor.

The safety lock 56 includes a locking shaft 58, a laterally extending arm operator 60, a bias spring 62 wrapped around bias shaft 64, a cotter key 53 connecting an end of bias shaft 64 with lock shaft 58, the other end of bias shaft 64 extending through hole 65 in flange 66, flange 66 and pull rod 68 with line connector 70. A pull cord 71 attaches to line connector 70 and functions similarly to pull cord 55.

A common cord 69 may be used to operate both the safety lock 56 and hook member 32 through separate pull cords 55, 71. To accomplish this, a spring 73 is inserted between a tie point 75 and line connector 70. Spring 73 is sufficiently lighter than spring 48 to retract locking shaft 58 before spring 48 begins to compress and allow pivotal movement of hook member 32. As common cord 69 is operated further, arm operator 60 contacts back plate 30 to limit movement of locking shaft 58 and prevent its interfering with hook member 32 and spring 48. A shoulder 72 is formed on the hook member 32 in a position to receive the end of locking shaft 58 which prevents hook member 32 from being retracted by release and spring operator 44 without first releasing safety lock 56 by pulling on pull cord 71. A vertical pivot member 74 interconnects locking shaft 58 and arm operator 60 and is pivotally mounted between the holes 75 in opposite sides of cover 76. Vertical pivot 74 thus holds safety lock 56 in position.

Cover 76 is best shown in FIG. 1 and completely surrounds the portions of safety lock 56 and combination release and spring operator 44 which extend rearwardly of back plate 30. This prevents damage to these mechanisms and also minimizes the possibility of mud or other material jamming the hitch 20. Cover 76 may be hinged or otherwise attached to the hitch 20 so as to permit rapid removal thereof and cleaning or inspection of the operators enclosed therein. Holes 78 and 79 are formed in jaw members 26 and 28 respectively and are aligned with shoulder 72 to provide for the insertion of manual locking pin 80. Locking pin 80 may be used when a load is to be hauled over a long distance and provides a manual, foolproof lock which prevents the hitch 20 from being operated with the safety lock 56 and combination release and spring operator 44 from the cab of the tractor.

The hitch member 22 includes a rectangular beam 82 extending forwardly of back plate 30 which is received by a rectangular box 84. A divider plate 86 is mounted within the central cavity of rectangular box 84. A mounting bolt 88 extends from the back wall 90 of rectangular beam 82, through divider plate 86 and is secured to a free floating end plate 92 by nut 94 and cotter key 96. Guides 95 are provided on end plate 92 to prevent it from becoming mis-aligned or from dropping out of rectangular box 84. Shock absorbing springs 98 and 100 encircle mounting bolt 88 and extend between end plate 92, divider plate 86 and back wall 90 to provide a shock absorbing action in both fore and aft directions. Neoprene pads or other suitable shock absorbing material could be used in place of springs 98, 100, if desired. A mounting flange 102 is secured to the top of rectangular box 84 and has mounting holes 104 to mount the hitch 20 to a tractor or other vehicle.

OPERATION

Applicant's automatic hitch with safety release 20 combines all of the desirable advantages of an automatic hitch while also providing a safety lock which is remotely operable with a manual override to disable the safety lock. The hitch 20 may be mounted on the rear end of a tractor, such as on the draw bar, or on any other vehicle used to tow wagons, trailers or the like. The hitch may be easily mounted by the mounting plate portion 24 through use of mounting holes 104 or other structure (not shown) to suit the particular vehicle. Once mounted, the hitch may be used to automatically engage or disengage a trailer having a pin 35 as follows.

The tractor is backed so that jaw members 26, 28 are centered about pin 35. A manual lifting bar (not shown) may be used by the operator to reach back and elevate the tongue of the trailer so as to align pin 35 with jaw members 26, 28. Also, a bar type extension (not shown) may be provided on the tractor draw bar and the hydraulic lift of the tractor may be used to elevate the tongue of the trailer and align pin 35 with jaw members 26, 28. Once pin 35 is aligned and ready for insertion, safety lock 56 is operated or retracted from shoulder 72 of hook member 32 so as to permit hook member 32 to be pivoted about pivot pin 42. Hook member 32 has a tapered head member such that as the tractor is back against the trailer and pin member 35 contacts the head of hook member 32, the pressure of pin 35 against the taper forces open hook member 32 and causes it to rotate or pivot about pivot pin 42. This pivoting action is depicted in phantom lines in FIG. 1.

Hook member 32 depresses spring 48 against washers 54 as it contacts back plate 30. Spring member 48 thus resists the pivoting of hook member 32 but this force is overcome by pivot pin 35. As pivot pin 35 clears the end of hook member 32, spring 48 forces hook member 32 back into its closed position and pin 35 is caught within the space formed between jaw members 26, 28 and hook member 32, as is shown in FIG. 1. Safety lock 56 may be released (if it hasn't already) and hook member 32 is locked into the closed position by bias spring 62 which causes lock shaft 58 to rotate about pivot member 74 and hold lock shaft 58 against shoulder 72. It should be noted that safety lock 56 need only be held open until shoulder 72 clears the end of lock shaft 58 as hook member 32 is pivoted open by pin member 35. This is only a short part of hook member 32 movement and thus the operator need only intervene for a small part of the latching sequence. Once the latch is closed about pin member 35, manual lock pin 80 may be dropped into position through holes 78, 79 in cover 76 to manually override safety lock 56 and prevent hook member 32 from being retracted. This is most important when the wagon or other load is to be towed over a significant distance as the automatic features of the hitch 20 are ineffective in opening hitch 20 when manual locking pin 80 is inserted into position.

Unlatching the hitch 20 is just as simple, if not more so, as latching the hitch. When the wagon or other load is placed in its desired location, manual lock pin 80 is removed (if in place) and safety lock 56 is operated by use of pull cord 71. By pulling on pull cord 71, line connector 70 and pull rod 68 cause lock shaft 58 to pivot about pivot members 74 and away from shoulder 72. The forward end of lock shaft 58 pivots towards flange 66 and compresses bias spring 62 as bias shaft 64 moves through hole 65, thus resisting opening of safety lock 56. The combination release and spring operator 44 is then operated by use of pull cord 55 to pivot hook member 32 out of its closed position and into its fully opened position. As in the latching operation, safety lock 56 need only be operated long enough to clear shoulder 72 as hook member 32 pivots into the opened position. Hook member 32 is shaped so that lock shaft 58 will ride along its outer edge once it clears shoulder 72. Thus, the operator need only momentarily operate safety lock 56 and then maintain pressure on pull cord 55 to operate the combination release and spring operator 44 and open the hitch 20. After the hook member 32 is into the fully opened position, the tractor or other vehicle with the hitch 20 may then be driven away in a generally straight direction and the wagon or other load becomes unhitched. After clearing pin 35 from jaws 26, 28, the combination release and spring operator 44 may be disengaged and hook member 32 allowed to return to the closed position. Safety lock 56 will automatically return to its locked position through the force of bias spring 62. Thus, automatic hitch and safety lock 20 is ready for the next wagon or trailer.

Various changes and modifications to the disclosed embodiment would be obvious in view of applicant's teaching. The preferred embodiment is disclosed and described by way of example only and applicant intends that this invention be limited only by the scope of the claims appended hereto.

What is claimed is:

1. In a hitch having two laterally opposed jaw members, a movable hook member disposed between said jaw members, said hook member being pivotable from a normally closed position to an open position, means biasing the hook member into the closed position, and means to retract said hook member into the open position from a location remote to said hitch, the improvement comprising a safety member to selectively prevent the hook member from being retracted into the open position, said safety member having means to be released from a location remote to said hitch and means to coordinate the safety member release means with the hook member retraction means, said coordinating means including a common operator for said hook member and said safety member, said common operator including a common operating cord, a hook member cord extending between said common operating cord and said hook member, and a spring extending between said common operating cord and said safety member so that movement of said common operating cord to open said hitch retracts said safety member before said hook member.

2. The device of claim 1 wherein said safety member is operable independently of said hook retracting means.

3. The device of claim 1 wherein the hook member has a shoulder, said safety member including a shaft pivotable from a normal position adjacent said shoulder to a position spaced apart from said shoulder, said safety member locking said hook member in the closed position only when said shaft is adjacent said shoulder.

4. The device of claim 3 wherein said safety member further comprises a spring biasing the shaft into its normal position adjacent the shoulder of the hook member.

5. The device of claim 3 wherein each jaw member has been defining a hole therein, said holes being aligned with each other and with an area adjacent the shoulder of the hook member, the vertical axis of said holes being outside the periphery of the hook member and spaced apart from the shoulder, and further comprising a locking pin for insertion into said holes to thereby manually lock the hook member in the closed position independently of the safety member.

6. The device of claim 1 further comprising a cover to substantially enclose the combination release and operator and the safety member to thereby prevent damage to them or interference with their operation.

7. A hitch having two laterally opposed jaw members, a movable hook member disposed between said jaw members, said hook member being freely pivotable from a normally closed position to an open position, a combination release and spring operator having means biasing the hook member into the closed position and means to retract said hook member into the open position from a location remote to said hitch, a safety member to selectively prevent the hook member from being retracted into the open position, said safety member having means to be released from a location remote to said hitch, and means to coordinate the safety member release means with the hook member retraction means, said coordinating means including a common operator for said hook member and said safety member, said common operator including a common operating cord, a hook member cord extending between said common operating cord and said hook member, and a spring extending between said common operating cord and said safety member so that movement of said common operating cord to open said hitch retracts said safety member before said hook member.

8. The device of claim 7 further comprising a mounting plate for attaching the hitch to a vehicle and shock absorbing means between said hitch and said mounting plate.

9. The device of claim 8 wherein the hitch includes a rectangular beam and the mounting plate includes a rectangular box with a central cavity divider plate for slidably receiving said beam, a mounting bolt extending from said beam through said divider plate and attaching to a free floating end plate, and spring means between said end plate end said divider plate and between said divider plate and beam so that the hitch is substantially free floating from said mounting plate and said springs stabilize said hitch.

* * * * *